United States Patent [19]

Lecourt et al.

[11] Patent Number: 5,024,712
[45] Date of Patent: Jun. 18, 1991

[54] PROCESS AND MACHINE FOR MANUFACTURING TUBULAR PIECES FROM AT LEAST ONE WEB OF SUPPLE MATERIAL AND TUBULAR PIECES THUS OBTAINED

[75] Inventors: Guy Lecourt, Vauhallan; Jacques Riou, Verrueres le Buisson, both of France

[73] Assignee: Aerospatiale Societe Nationale Industrielle, Paris, France

[21] Appl. No.: 520,122

[22] Filed: May 7, 1990

Related U.S. Application Data

[63] Continuation of Ser. No. 261,905, Oct. 25, 1988, abandoned.

[30] Foreign Application Priority Data

Nov. 3, 1987 [FR] France ................ 8715229

[51] Int. Cl.$^5$ .................... B31C 13/00; B65H 81/00
[52] U.S. Cl. .................... 156/184; 156/190; 156/195; 156/429; 156/431; 156/432
[58] Field of Search .................... 156/190–192, 156/194–195, 425, 428–432, 184, 446, 171, 173

[56] References Cited

U.S. PATENT DOCUMENTS

| | | | |
|---|---|---|---|
| 2,250,430 | 7/1941 | Wade | 156/431 X |
| 2,731,070 | 1/1956 | Meissner | 156/191 X |
| 2,815,043 | 12/1957 | Kleiner et al. | 156/195 X |
| 3,279,333 | 10/1966 | Blair et al. | 156/190 X |
| 3,328,224 | 6/1967 | Kennedy et al. | 156/432 X |
| 3,400,029 | 9/1968 | Mesrobian et al. | 156/190 X |
| 3,497,413 | 2/1970 | Ullman et al. | 156/446 X |
| 3,524,779 | 8/1970 | Masters et al. | 156/195 X |
| 3,782,889 | 1/1974 | Panico | 432/59 |
| 4,078,957 | 3/1978 | Bradt | 156/173 |

FOREIGN PATENT DOCUMENTS

| | | |
|---|---|---|
| 0233439 | 8/1987 | European Pat. Off. |
| 1359169 | 3/1964 | France |
| 2107457 | 4/1972 | France |
| 2125127 | 9/1972 | France |
| 6127238 | 7/1984 | Japan |
| 861556 | 2/1961 | United Kingdom ........ 156/429 |
| 897940 | 5/1962 | United Kingdom |
| 8503906 | 9/1985 | World Int. Prop. O. |

*Primary Examiner*—Richard Bueker
*Assistant Examiner*—James J. Engel, Jr.
*Attorney, Agent, or Firm*—Fisher, Christen & Sabol

[57] ABSTRACT

This invention relates to a process and a machine for manufacturing a tubular piece from at least one web of supple material, the machine comprising a mandrel around which the or each web is capable of being helically wound, and means for driving by friction the or each web wound around the mandrel, parallel to the longitudinal axis of the mandrel. According to the invention, the or each web being constituted by a resistant reinforcement bonded at least on the surface to a polymerizable product, heat regulation means are provided in the zone of said drive means.

11 Claims, 1 Drawing Sheet

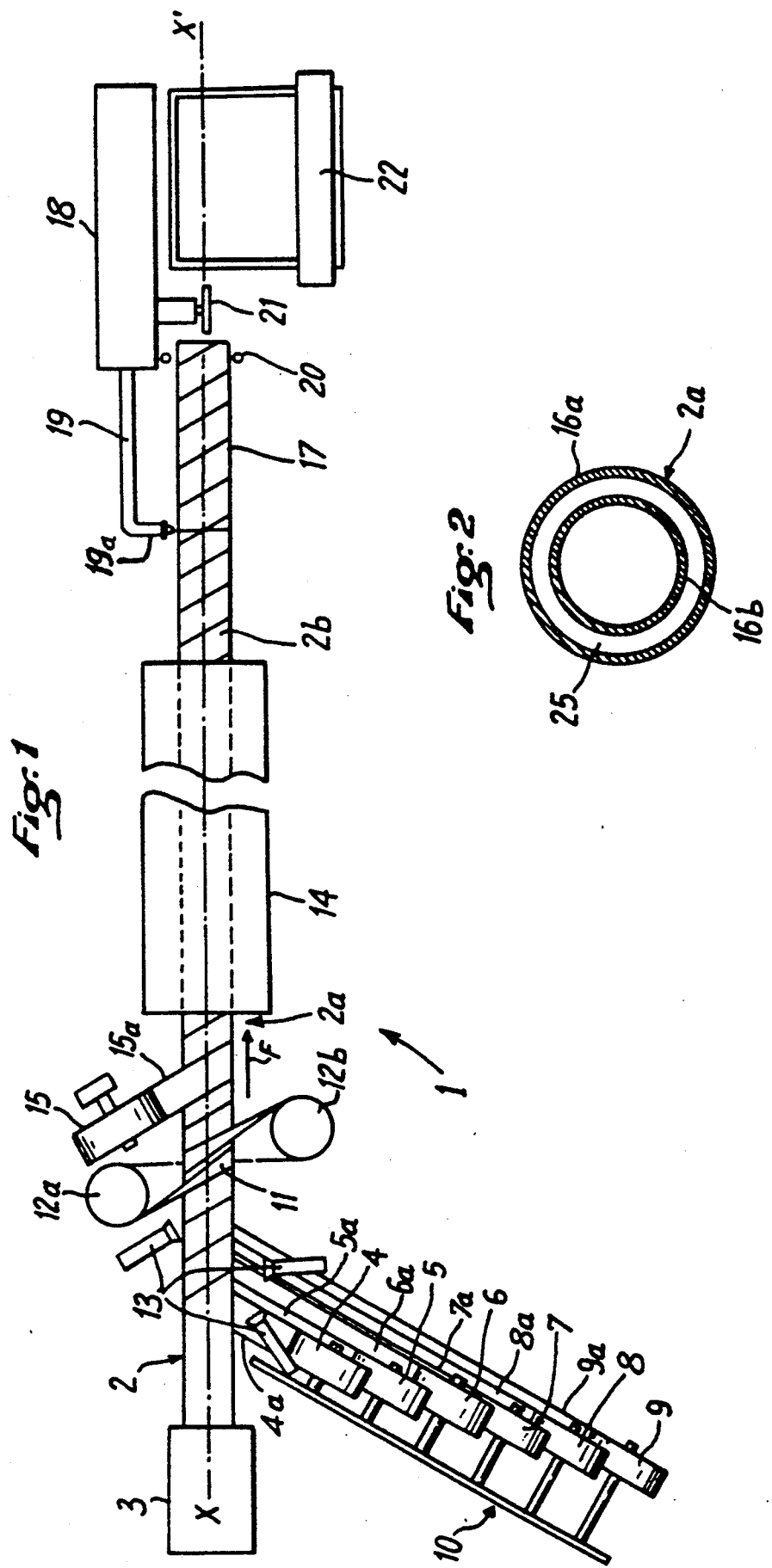

PROCESS AND MACHINE FOR MANUFACTURING TUBULAR PIECES FROM AT LEAST ONE WEB OF SUPPLE MATERIAL AND TUBULAR PIECES THUS OBTAINED

This application is a continuation of Ser. No. 261,905 filed Oct. 25, 1988, now abandoned.

FIELD OF THE INVENTION

The present invention relates to a process for manufacturing tubular pieces, as well as to a machine for carrying out said process.

BACKGROUND OF THE INVENTION

Within the scope of the invention, the tubular pieces are generally made from a resistant reinforcement bonded at least on the surface to a polymerizable product. Such pieces may be used for packing pressurized liquids or gas, for transferring fluids, as mechanical support, or as packings of projectiles or missile launching tubes, in particular.

It is known to make such tubular pieces from fibers, for example glass fibers bonded by a polymerizable resin, which are either wound in contiguous manner around a mandrel, or disposed contiguously side by side around a mandrel, extending parallel to said mandrel, or by straight winding of a sheet of such material on itself around a mandrel. However, none of these solutions has proved entirely satisfactory from the standpoint of mass-production. In addition, it is difficult, if not impossible, to carry out such processes continuously.

Furthermore, a process for manufacturing a tube of cardboard or like material from at least one web of cardboard is known, in which the or each cardboard web is helically wound around a mandrel, and the or each web wound around the mandrel is driven parallel to the longitudinal axis of the mandrel with the aid of frictional drive means.

Such a process allows cardboard tubes having a good resistance to buckling to be continuously produced in simple and reliable manner. However, such a process could not be used as such for making tubular pieces from webs constituted by a resistant reinforcement bonded at least on the surface to a polymerizable product, due to the very presence of said polymerizable product.

It is therefore an object of the present invention to adapt said known process to the production of tubular pieces as defined hereinabove.

SUMMARY OF THE INVENTION

To that end, the process for manufacturing a tubular piece from at least one web of supple material, in which the or each web is helically wound around a mandrel, and the or each web wound around the mandrel is driven parallel to the longitudinal axis of the mandrel with the aid of frictional drive means, is noteworthy, according to the invention, in that, the or each web being constituted by a resistant reinforcement bonded at least on the surface to a polymerizable product, a support layer, which does not adhere to the mandrel, is provided between said mandrel and the or each web, and, in the zone of said frictional drive means, the temperature of the polymerizable product is adjusted so as, on the one hand, to avoid transfer of said polymerizable product on said drive means and, on the other hand, to allow compacting of said piece by said means.

It is thus possible to produce tubular pieces continuously from at least one web constituted by a resistant reinforcement bonded at least on the surface to a polymerizable product, which pieces present good mechanical properties and are light and inexpensive.

In particular, where an epoxy resin is used as polymerizable product, the temperature in said zone is maintained between 80° and 90° C.

The temperature of the mandrel is advantageously adjusted so as to avoid an excessive thermal expansion thereof. For a steel mandrel, it is desirable to maintain the temperature of the mandrel at less than 80° C.

The present invention also relates to a machine for manufacturing a tubular piece from at least one web of supple material, for carrying out the above process, of the type comprising a mandrel around which the or each web is capable of being helically wound, and means for driving by friction the or each web wound around the mandrel, parallel to the longitudinal axis of the mandrel, and noteworthy, according to the invention, in that, the or each web being constituted by a resistant reinforcement bonded at least on the surface to a polymerizable product, heat regulation means are provided in the zone of said drive means.

Said heat regulation means advantageously create a plurality of jets of hot air.

According to another feature of the invention, the machine comprises, downstream of said drive means, means for polymerizing said product.

In particular, said polymerization means are constituted by an oven presenting at least two heating zones.

According to yet another feature of the invention, said mandrel presents a double jacket for circulation of a heat regulating fluid.

Furthermore, said drive means may be constituted by an endless belt or a succession of endless belts.

According to a further feature of the invention, between said drive means and said polymerization means are provided means for helically winding on said piece a film for retaining it during polymerization.

BRIEF DESCRIPTION OF THE DRAWINGS

The invention will be more readily understood on reading the following description with reference to the accompanying drawings, in which:

FIG. 1 is a schematic view of the machine for manufacturing a tubular piece according to the invention.

FIG. 2 is an enlarged view in transverse section of the mandrel of the machine of FIG. 1.

DETAILED DESCRIPTION OF THE DRAWINGS

Referring now to the drawings, it should firstly be noted that the machine 1 shown therein is adapted, by way of example, for manufacturing a tubular piece from a plurality of webs (three in this example) of fabric of glass impregnated with epoxy resin, two webs of resistant paper or cardboard and a web of separator film made of polypropylene. The cardboard webs, in contact with the fixed mandrel, allow translation of the other webs. The separator film isolates the last web of cardboard from the first web of pre-impregnated glass fabric so that the fabric does not adhere to the cardboard.

The different webs of material from which the tubular piece is made are capable of being wound around a mandrel 2 fixed in a mandrel-holder 3. To that end, reels 4, 5 of cardboard, a reel 6 of separator film and reels 7, 8, 9 of fabric pre-impregnated with resin, are mounted on a paying-out reel 10, which presents, with respect to the longitudinal axis X—X' of the mandrel 2, a lead angle determined as a function of the diameter of the mandrel and of the width of the webs, enabling contiguous turns to be obtained. Furthermore, the reels 4–9 are offset with respect to one another on the paying-out reel 10 in order to obtain a certain overlap of one web with respect to another.

An endless belt 11, mounted on two driving pulleys 12a, 12b, drives the webs 4a–9a, wound around mandrel 2, parallel to the longitudinal axis X—X' of the mandrel in the direction of arrow F. Moreover, heat regulation means 13, creating for example jets of hot air, are provided in the zone of the belt 11. The temperature of the polymerizable product (resin) impregnating the webs of glass fabric may thus be regulated so as, on the one hand, to avoid transfer of said polymerizable product on the belt 11 and, on the other hand, to allow compacting of the piece by said belt. In the particular case of an epoxy resin, the temperature in said zone is maintained at between 80° and 90° C.

Downstream of the drive belt 11 there is provided a polymerization oven 14, it being obvious that polymerization might be obtained by other means, in particular by ultra-violet radiation.

The polymerization oven 14 is advantageously made so as to present at least two heating zones in order to effect polymerization of the resin without thermal shock. In the case of an epoxy resin, for the product to be taken to 110°–120° C. in a first zone and 130°–140° C. in the second zone, the displayed regulation temperatures are 220° and 270° C. respectively.

Moreover, between the drive belt 11 and the polymerization oven 14, a film 15a, for example identical to the separator film 6a, unwound from a reel 15, is helically wound on the tubular piece so as to retain it during polymerization, thus avoiding a "dispersion" of the diameters.

Furthermore, in order to allow a thermal regulation of the mandrel so as to avoid an excessive expansion thereof, a first part 2a of the mandrel 2 presents a double jacket constituted by an outer wall 16a and inner wall 16b defining a space 25 for circulation of a heat regulation fluid (FIG. 2). When this part 2a of the mandrel is made of steel, the temperature thereof must be maintained at less than 80° C. Part 2b of the mandrel 2 beyond the outlet of the oven 14 may be made of a light alloy, for example of aluminium.

Once polymerization is terminated, the tubular piece may be cut into sections 17. To that end, it is desirable to carry out a process of contactless cutting: cutting by fluid jet, laser beam, electron beam, etc...

As in the embodiment shown, a laser beam (for example $CO_2$) may be used. On the laser apparatus 18 is mounted a telescopic tube 19 adapted to move parallel to the longitudinal axis X-X' of the mandrel in synchronism with the displacement in the direction of arrow F of the tubular piece. The laser beam issuing from end 19a of the tube 19 may thus cut the tubular piece in a circle. An adjustable optical cell 20 controls displacement of tube 19.

An extractor 21 receives section 17 once cut off and ejects it onto a receptacle 22. The webs of cardboard, the separator film and the retaining film may then be withdrawn.

It is obvious that the numbers of webs of the different materials used in this embodiment are not limited to those indicated. In addition, in place of an epoxy resin, another polymerizable resin may be used, such as, for example, a polyester resin. Similarly, in place of the glass fabric, another resistant reinforcement may be used, such as, for example, one or more metal strips coated with polymerizable adhesive.

Furthermore, the properties of the tubular piece may be improved by adding thereto a metallized foil for improved seal and/or a lattice of metal wires for protection against electromagnetic aggressions and/or reinforcement at the points under particular stress.

What is claimed is:

1. A process for manufacturing a tubular composite, comprising the steps of:
   (a) helically winding on a mandrel at least one web of material which does not adhere to said mandrel to form a tubular support layer on the mandrel;
   (b) helically winding on said tubular support layer at least one separator film for forming a tubular separation layer superimposed on the support layer;
   (c) helically winding on said tubular separation layer at least one web of a composite material comprising a fiber fabric impregnated with a polymerizable resin for forming a tubular composite layer;
   (d) driving and compacting said tubular support layer, said tubular separation layer and said tubular composite layer parallel to the longitudinal axis of said mandrel by a friction drive means;
   (e) adjusting the temperature of said polymerizable resin in a zone of said friction drive means so as to avoid transfer of said polymerizable resin on said drive means without substantial curing of said polymerizable resin, and to allow compacting of said composite layer by said drive means to form a tubular composite;
   (f) curing said polymerizable resin downstream of said friction drive means;
   (g) cutting said tubular composite into a desired length; and
   (h) separating said tubular support layer and said tubular separation layer from said tubular composite layer.

2. The process of claim 1 wherein said polymerizable resin is an epoxy resin, and the temperature of said resin is adjusted to between 80° and 90° C.

3. The process of claim 1 wherein the temperature of the mandrel is adjusted so as to avoid an excessive thermal expansion thereof.

4. The process of claim 3 wherein the mandrel is comprised of steel and the temperature of the mandrel is maintained at less than 80° C.

5. An apparatus for manufacturing a tubular composite material, comprising:
   (a) a cylindrical mandrel;
   (b) means for helically winding on said mandrel at least one web of a material which does not adhere to said mandrel, for forming a tubular support layer;
   (c) means for helically winding on said tubular support layer at least one web of a separator film for forming a tubular separation layer;
   (d) means for helically winding on said tubular separation layer at least one web of a composite material impregnated with a polymerizable resin for forming a tubular composite layer;
   (e) friction driving means for compacting and driving said tubular support layer, said tubular separation layer and said tubular composite layer parallel to the longitudinal axis of said mandrel;

(f) means for regulating the temperature of said tubular composite layer in a zone defined by said driving means to prevent transfer of said polymerizable resin to said drive means without substantial curing of the polymerizable resin;

(g) means for helically winding a film for retaining said composite layer during curing, wherein said means is disposed between the drive means and a curing means;

(h) means for curing said polymerizable resin of the composite material downstream of the drive means; and (i) means for cutting the cured tubular composite layer into pieces to form a tubular composite material.

6. The apparatus of claim 5 wherein said means for regulating the temperature of the opposite layer comprises a plurality of jets for delivering hot air to said composite layer.

7. The apparatus of claim 5 wherein said means for curing the resin comprises an oven having at least two heating zones.

8. The apparatus of claim 5 wherein said mandrel comprises a double jacket for circulation of a heat regulating fluid.

9. The apparatus of claim 5 wherein said driving means comprises an endless belt encircling the composite layer and forms a support layer.

10. A tubular composite material manufactured by the process of claim 1.

11. A process for manufacturing a tubular composite comprising the steps of:
(a) winding a support material in helically overlapping turns on a fixed cylindrical mandrel to form a tubular support layer, wherein the support material is not adherent to the mandrel,
(b) winding a separator material in helically overlapping turns on the tubular support layer,
(c) winding a heat polymerizable resin-impregnated composite material in helically overlapping turns on the separator material to form a continuous tubular composite,
(d) adjusting the temperature of the polymerizable resin to a predetermined temperature to prevent said resin from transferring to a drive means for driving said composite and without substantial curing of said resin,
(e) conveying and compacting the continuous tubular composite axially along the mandrel by a drive belt passing helically around the mandrel,
(f) winding a removable retaining film in helically overlapping turns on the composite,
(g) subsequently curing the polymerizable resin and machining the continuous tubular composite into predetermined lengths,
(h) removing the lengths of the continuous tubular composite from the mandrel,
(i) separating the support material and the separation layer from the composite material.

* * * * *